Figure 1:
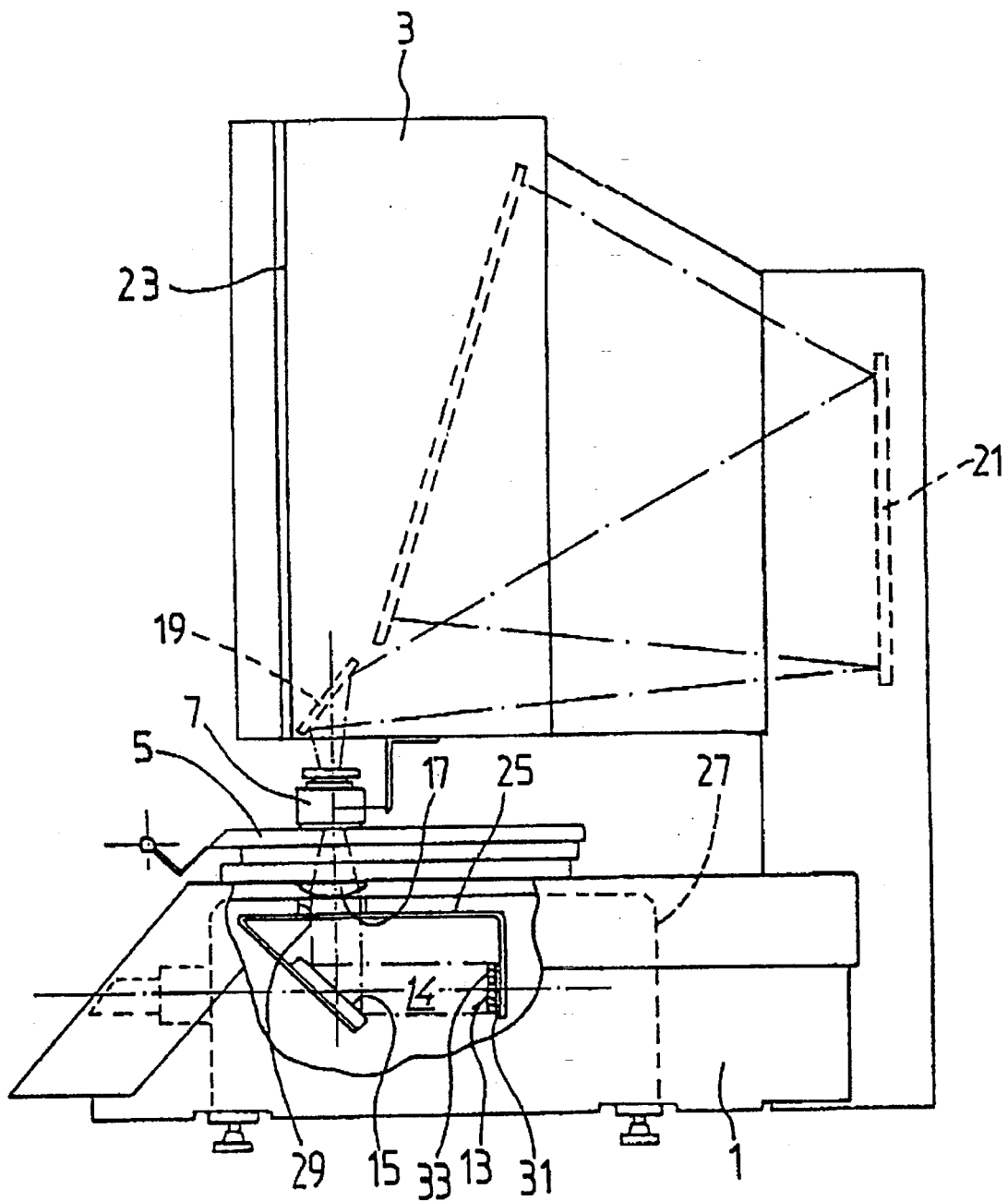

United States Patent [19]

Krzywdziak et al.

[11] Patent Number: 5,647,654
[45] Date of Patent: Jul. 15, 1997

[54] MICROFICHE READER

[75] Inventors: Alain Krzywdziak; Maurice Hersant, both of Orleans, France

[73] Assignee: F.A.S., France

[21] Appl. No.: 640,837

[22] PCT Filed: Nov. 8, 1994

[86] PCT No.: PCT/FR94/01304

§ 371 Date: May 8, 1996

§ 102(e) Date: May 8, 1996

[87] PCT Pub. No.: WO95/13563

PCT Pub. Date: May 18, 1995

[30] Foreign Application Priority Data

Nov. 9, 1993 [FR] France ................................ 93 13364

[51] Int. Cl.⁶ .................................................. G03B 21/14
[52] U.S. Cl. ................................. 353/27 R; 353/25
[58] Field of Search ........................... 353/23, 25, 27 R, 353/27 A, 26 R, 26 A

[56] References Cited

U.S. PATENT DOCUMENTS

| | | | |
|---|---|---|---|
| 3,733,121 | 5/1973 | Smitzer | 353/23 |
| 3,944,350 | 3/1976 | Yerick | 353/27 R |
| 4,143,953 | 3/1979 | Rauffer | 353/27 R |
| 4,339,183 | 7/1982 | Yamada et al. | 353/27 R |
| 4,727,289 | 2/1988 | Uchida | 315/71 |
| 4,805,087 | 2/1989 | Frankel et al. | 353/25 |

FOREIGN PATENT DOCUMENTS

| | | |
|---|---|---|
| 62-124781 | 6/1987 | Japan . |
| 1263249 | 2/1972 | United Kingdom . |
| 2098714 | 11/1982 | United Kingdom . |

*Primary Examiner*—William Dowling
*Attorney, Agent, or Firm*—Scully, Scott, Murphy & Presser

[57] ABSTRACT

Microfiche reader characterized in that it comprises a light source (13) consisting of a high brightness electroluminescent diode assembly (33), arranged on a supporting surface (31) capable of focusing the light flux (14) produced by the diodes onto the element of the optical arrangement of the apparatus.

11 Claims, 4 Drawing Sheets

MICROFICHE READER

The present invention relates to a microfiche reader intended, by means of a suitable optical arrangement, to project a light beam emitted by a light source onto a selected field of a microfiche in order to visualize it on a projection surface or screen, comprising a microfiche holder which can be moved in translation relative to a projection lens, the microfiche being inserted between two transparent glass plates, it being possible to move one of the plates away from the other, for example by pivoting, in order to allow it to be fitted or withdrawn.

The light source of this apparatus usually consists of a dichroic-reflector halogen lamp with low voltage and high luminous power. However, this arrangement requires a voltage transformation electric circuit in order to supply the lamp using the electric mains current, and the significant heating of the lamp additionally makes it necessary for it to be arranged in a suitable case which is relatively far from the microfiche holder and is suitably ventilated.

The object of the invention is to overcome these drawbacks by providing a microfiche reader, of the aforementioned type, characterized in that it includes a light source consisting of a set of high-luminosity light-emitting diodes arranged on a support surface capable of focusing the light flux emitted by the diodes onto the elements of the optical arrangement of the apparatus.

The light-emitting diodes are advantageously juxtaposed over the extent of the support surface, but they may, of course, be arranged in any other shape configuration, for example in concentric rings on the support surface.

Said support surface may be planar or curved, and preferably concave so as itself to focus the light emission as much as possible.

The light-emitting diodes of the reader thus together ensure a sufficient luminous power, their number and their installation area being determined to this end. They are supplied directly by the mains current and with much less overall heating than a conventional halogen lamp, with an equivalent luminous power. Similarly, the power consumption is significantly reduced. In addition, they are inexpensive, even in large numbers, and their service life is significantly longer (approximately 10,000 hours as compared to 2,000 for a halogen lamp).

The reader according to the invention does not require an expensive electrical conversion circuit for the current or a system for cooling the lamp (generally a cooling system with ventilation fins on conventional readers). Moreover, the light source can be installed closer to the microfiche holder, which reduces the overall bulk of the apparatus.

Figure 2:
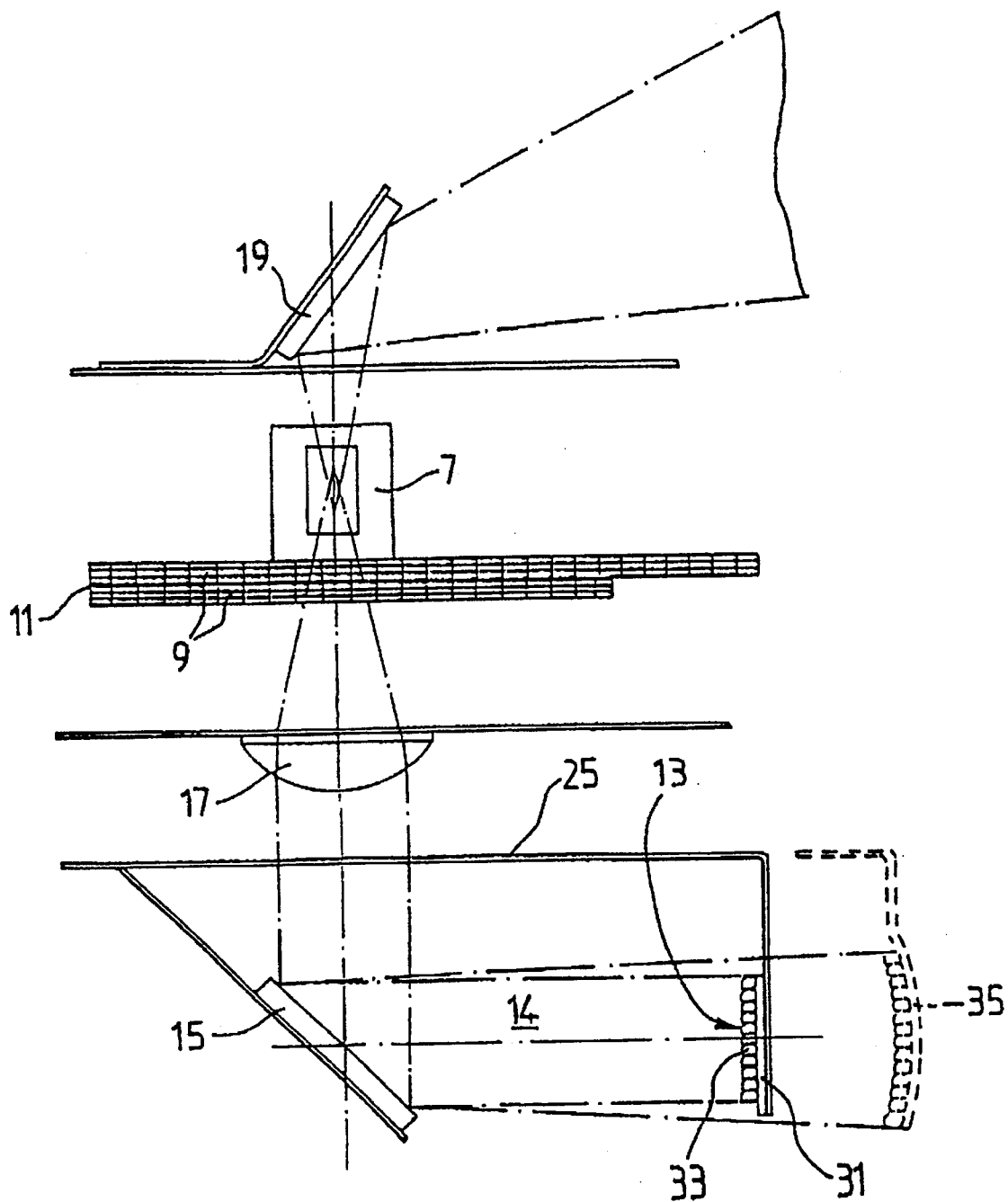
Figure 3:
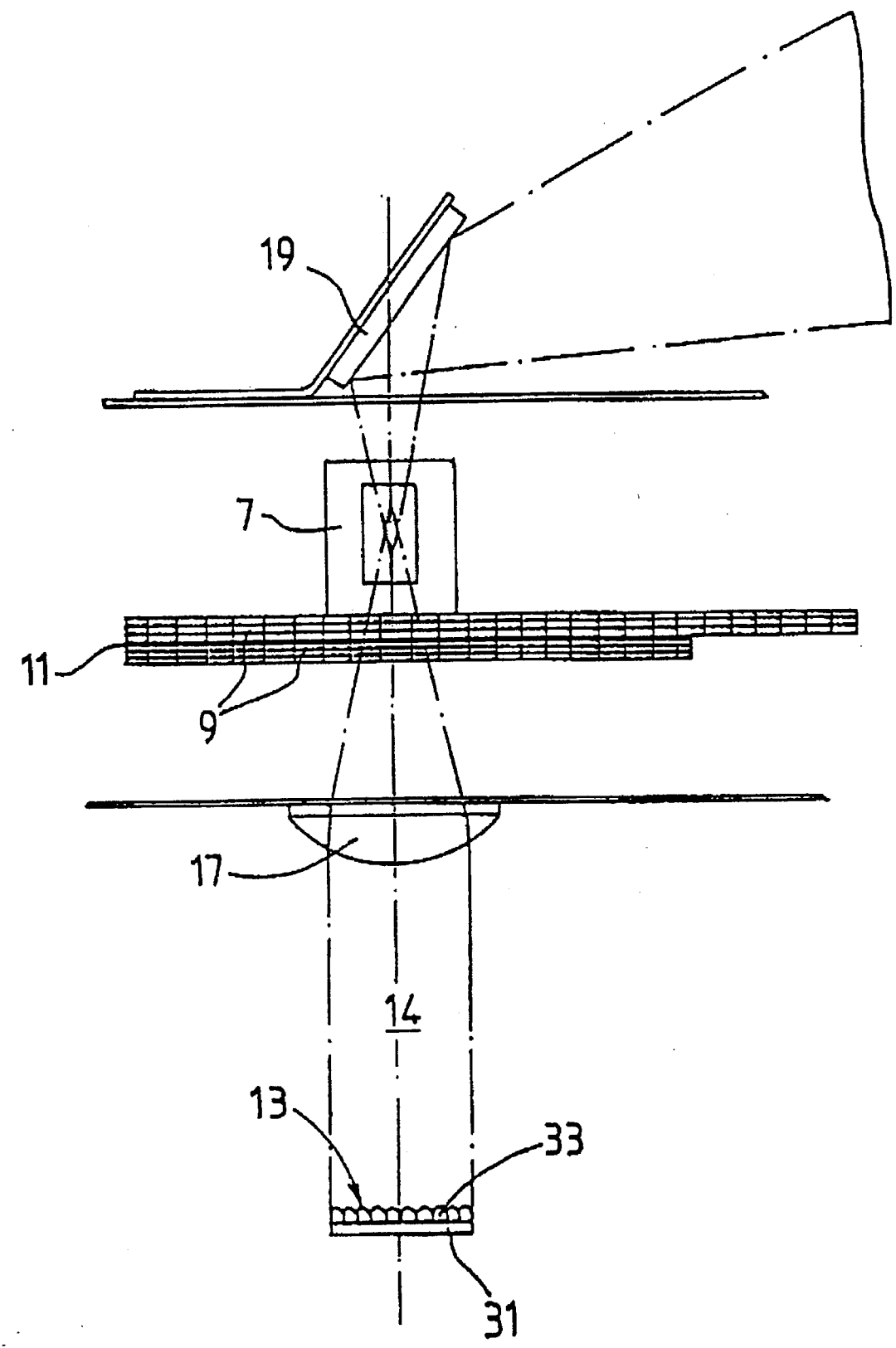
Figure 4:
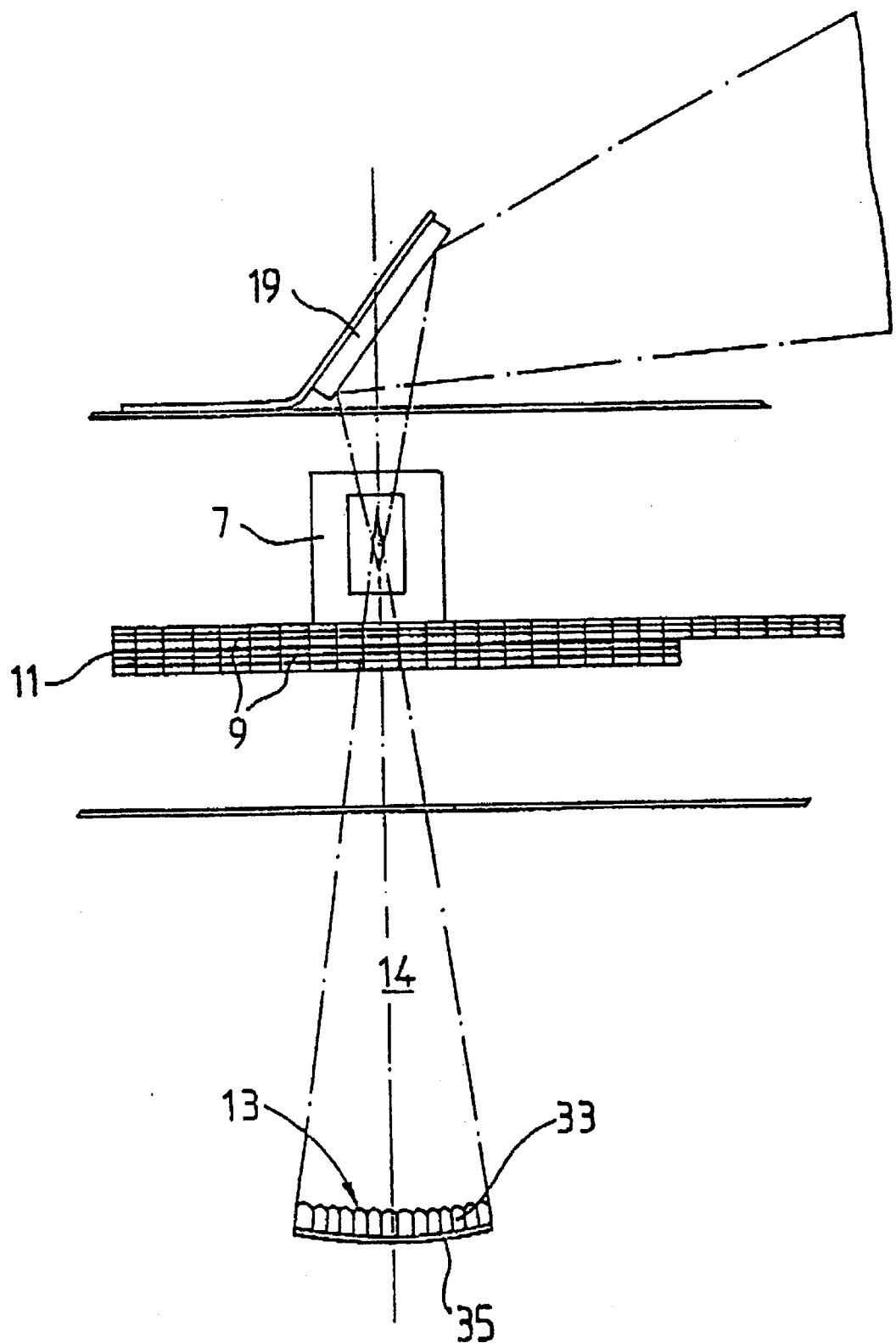

The invention is illustrated hereafter with the aid of an illustrated embodiment and with reference to the appended drawings, in which:

FIG. 1 is a schematic view, with cutaway, of the light-source device of a microfiche reader according to the invention, FIG. 2 is an enlarged sectional view of the optical device of this reader, and FIGS. 3 and 4 show alternative embodiments.

As represented in FIG. 1, the microfiche reader according to the invention comprises a lower base 1, an upper visualization screen 3 fixed on the base and a central microfiche holding device 5 mounted on the upper planar surface of the base. The lens 7 for focusing the image onto the screen is arranged just above the microfiche holder 5. This holder, of the type with conventional transparent glass plates 9, is mounted so that it can be moved in the plane of the lens so as to make it possible to select as desired the fields of the microfiche 11 visualized.

The lower base 1 houses the light source 13, which emits a light beam 14, a mirror 15 for reflecting the emitted light flux and a condenser lens 17 arranged vertically in line with the mirror 15. This condenser lens converges the light beam onto the lens 7 through the selected field of the microfiche. The resultant image beam is again reflected on a second reflecting mirror 19 (accommodated at the lower part of the screen) then on a third mirror 21, arranged at the rear part of the screen. The visualized image of the selected field is seen by the operator through the front face 23 of the screen. The light source 13 and the first reflecting mirror 15 are mounted on the folded opposite end parts of the same horizontal panel 25, these parts being respectively oriented vertically and at 45° to the vertical. They are accommodated in a specific electrically insulated case 27, in the upper surface of which a hole 29 is made for passage of the light flux emitted on leaving the first reflecting mirror. The light source consists of a plate element 31 which is fixed vertically on said panel 25 and the surface of which is furnished with high-luminosity light-emitting diodes 33 arranged side by side. By way of example, the plate may be a disk with a diameter of 60 mm and accommodate on its surface approximately one hundred light-emitting diodes with a diameter of 5 mm. These diodes have a luminous power of approximately 75 cd each at a voltage of 11 volts. They are supplied in groups of 20 in series with the mains voltage. The associated reflecting mirror 15, oriented at 45° to the vertical, integrally with the panel, makes it possible to reflect vertically the light beam emitted by the set of diodes toward the lens. This mirror is a disk having a diameter equal to at least $\sqrt{2}$ of the diameter of the plate.

It will also be noted, by way of variant, that so-called laser diodes, with high luminous efficiency, may also be used, as can diodes supplied at the 220 volt voltages, mounted in parallel on the mains supply.

In addition, as represented by a broken line in FIG. 2, the diode support plate element may have a concave shape forming by itself, with a suitable curvature, a focusing element 35 for the emitted light beam. The focused beam may further be projected vertically convergent (FIG. 4), without the first reflecting mirror 15 and without the aforementioned condenser 17, directly onto the lens through the selected image of the microfiche. The necessary condition is, however, that this concave surface has a focal point for focusing the light beam which lies substantially in correspondence with the focal point of the lens.

Optionally, if the light source is positioned close to the microfiche holder, the first reflecting mirror 15 can be omitted, regardless of the shape of the diode support surface, the emitted light beam being channeled in the axis of the lens virtually completely onto the condenser which nevertheless remains necessary for a planar support plate, as represented in FIG. 3.

Finally, the light-emitting diode may be grouped on a support surface outside a specific focusing surface of the emitted flux, for example on a small sphere arranged at the focal point of a parabolic focusing surface which converges the light beam directly onto the lens.

We claim:
1. A microfiche reader comprising:
   a microfiche holder including two transparent plates for holding a microfiche therebetween, one of the plates being movable relative to the other of the plates to allow a microfiche to be fitted and withdrawn from between the plates;

means movably supporting the microfiche holder;

a projection surface;

a light support surface;

a light source for emitting a light beam, the light source including a set of light-emitting diodes arranged on the light support surface and with high luminosity to generate the light beam; and an optical system having a plurality of elements for directing the light beam through a selected field of the microfiche and onto the projection surface to form thereon an illuminated image of said selected field;

wherein the light support surface is shaped so that the light beam is focused onto the elements of the optical system.

2. Microfiche reader according to claim 1, wherein the light-emitting diodes are juxtaposed over the extent of said support surface.

3. Microfiche reader according to claim 1, wherein the light-emitting diodes are supplied with electric current directly from an electric current source.

4. Microfiche reader according to claim 1, wherein said light support surface is planar.

5. Microfiche reader according to claim 1, wherein the light support surface is concave for converging the light beam directly onto an image focusing lens and through the selected field of the microfiche.

6. Microfiche reader according to claim 1, further including an electrically insulated supply case, arranged at a relatively short distance from the microfiche holder and provided with a hole for passage of the emitted light beam, and wherein the light support surface is installed in said supply case.

7. Microfiche reader according to claim 6, further including a support panel disposed in the supply case and having first and second opposite end faces, and wherein (i) the optical system includes a first mirror positioned on said first end face, and (ii) the light support surface is mounted on the second end face and is oriented vertically.

8. Microfiche reader according to claim 1, wherein the light-emitting diodes are laser diodes.

9. Microfiche reader according to claim 1, further including a focusing surface to converge the light beam directly onto the optical system.

10. A microfiche reader according to claim 7, wherein the optical system includes a condenser lens for focusing the light beam, and the light source directs the light beam directly onto the condenser lens without any mirror between the light source and the condenser lens.

11. A microfiche reader according to claim 9, wherein the focusing surface is a parabolic focusing surface, having a focal point; and the support surface is a sphere located at the focal point of the focusing surface.

* * * * *